J. H. WYATT.
LEVEL.
APPLICATION FILED JAN. 2, 1908.
917,699.
Patented Apr. 6, 1909.
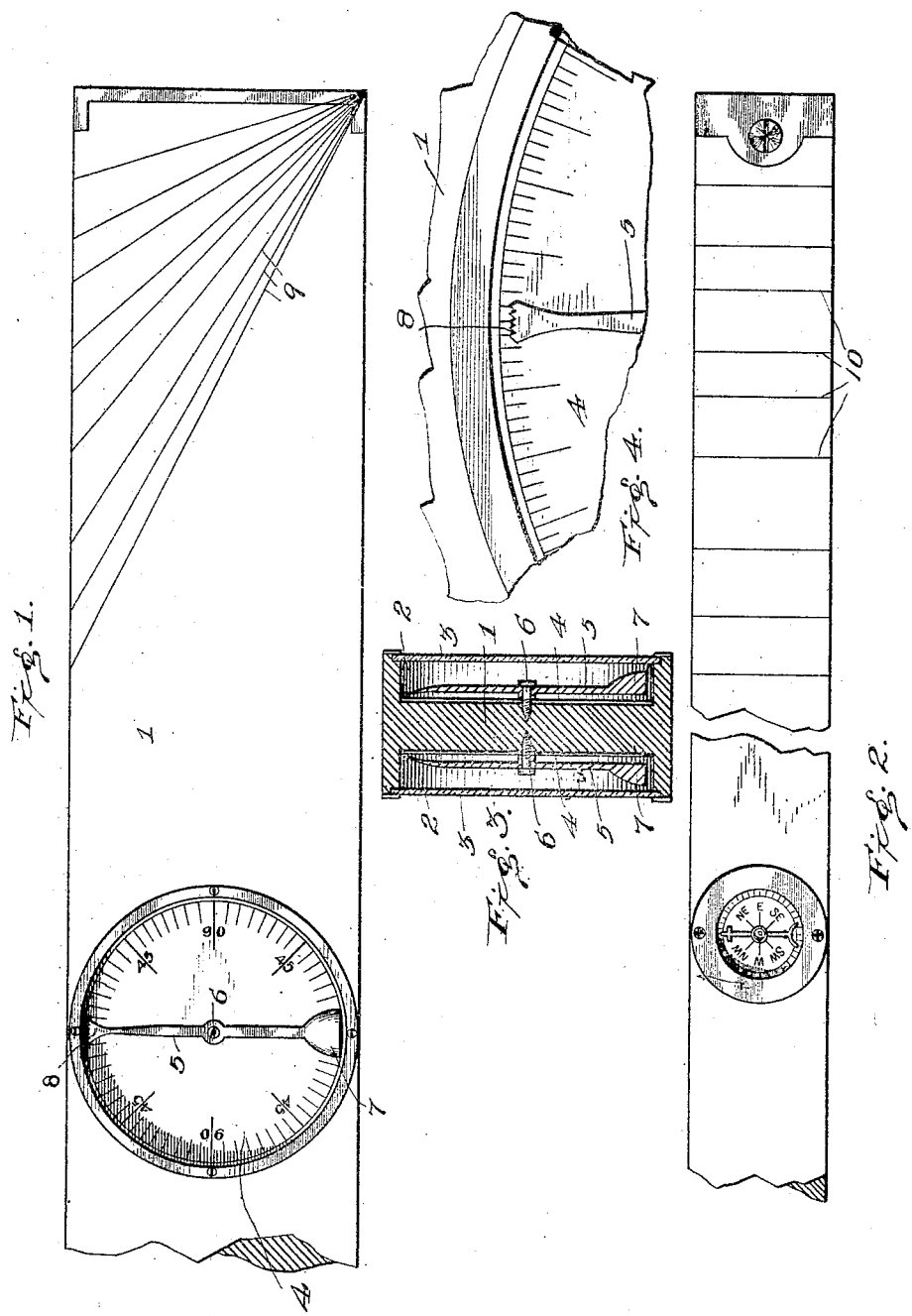
Witnesses
Roy C. Claflin
Frank J. Veihmeyer
Inventor
JOHN H. WYATT
by Elson Bro's
Attorneys

UNITED STATES PATENT OFFICE.

JOHN H. WYATT, OF ROCKY FORD, COLORADO, ASSIGNOR OF ONE-THIRD TO WALKER HALEY, OF ROCKY FORD, COLORADO.

LEVEL.

No. 917,699.　　　Specification of Letters Patent.　　　Patented April 6, 1909.

Application filed January 2, 1908. Serial No. 408,921.

*To all whom it may concern:*

Be it known that I, JOHN H. WYATT, a citizen of the United States, residing at Rocky Ford, in the county of Otero and State of Colorado, have invented certain new and useful Improvements in Levels; and I do hereby declare the following to be a full, clear, and exact description of the invention, such as will enable others skilled in the art to which it appertains to make and use the same.

My invention relates to levels for the use of carpenters, builders, etc. and belonging to the class known as plumb levels in which a pointer indicates the angles on a dial.

The object of the invention is to produce a level of this character which is more legible and consequently more convenient and satisfactory to use.

The invention also aims to provide an instrument or level which combines in itself a bevel and compass as well as a level.

The invention consists in the features of construction and combinations of parts hereinafter described and specified in the claim.

In the accompanying drawing, illustrating the preferred embodiment of my invention: Figure 1 is a broken side view of my level. Fig. 2 is a broken top edge view thereof. Fig. 3 is a cross section through the dials, and Fig. 4 is an enlarged view of the index end of one of the pointers and a portion of the dial against which it is placed.

Referring more particularly to the drawing, 1 designates the stock or wooden strip constituting the level proper. In the opposite lateral faces of said stock there are recesses 2, preferably circular, which are closed by glass plates 3 or other suitable transparent substance. On the inner face of each recess a dial 4 is arranged while at the center of said dial is revolubly mounted a pointer 5. Each pointer is preferably hung on a separate pivot pin 6.

One end of each pointer is weighted, as at 7, while the other or index end is provided with a series of notches or serrations leaving V-shaped points 8, preferably five in number. Each dial is graduated with three hundred and sixty degrees to the circle, beginning at zero at the top and bottom and counting both up and down to ninety degrees at the middle of each side. This arrangement permits of the level being used with equal success on either edge. The points 8 on the index end of the pointer are arranged one-half of a degree apart, the middle one being adapted to register with the zero mark on the dial when the instrument is level.

If one of the other points on either side of the index registers with the zero on the dial, it indicates that the instrument is one-half or a whole degree out of level, depending on whether it is one of the points next to the central one or one of the end points. In other words, the index must be moved two points to indicate one degree. It will be readily appreciated that the tooth edge or points on the index are much more easily discernible than a continuous graduated edge would be and that this construction combined with the arrangement of said points at half degrees apart renders the device more legible and convenient to use.

The side of the stock is ruled from one corner at either side to show various angles desired, as indicated by the lines 9 in Fig. 1. These lines are connected by others 10 on the edge of the stock, as illustrated in Fig. 2. A compass 11 is set in the edge of said stock as also shown in Fig. 2. The instrument thus serves as a level and compass as well as a level and takes the place of three separate instruments.

The rulings on the side of the stock act as a check upon the angles shown by the pointer on the dial and vice versa. Thus the cut made with a saw or other tool along a line laid off by the rulings may be verified as to correctness by the pointer and conversely an angle shown by the dial may be tested by the use of the rulings. This coöperation of the rulings and dial provides a ready means of detecting whenever the pointer is not working perfectly.

I claim:

The combination, with a rectangular stock having converging rulings extending across one side from one corner and parallel rulings across one edge from the ends of said side rulings, of a graduated dial on said stock and a gravity pointer pivoted on said dial whereby said rulings and pointer serve as checks upon one another as to the angles shown by each.

In testimony whereof, I affix my signature, in presence of two witnesses.

JOHN H. WYATT.

Witnesses:
S. W. CRISSY,
H. E. McMORRIS.